US007019049B1

(12) United States Patent
Yoo et al.

(10) Patent No.: US 7,019,049 B1
(45) Date of Patent: Mar. 28, 2006

(54) PROCESS FOR PREPARING THERMOPLASTIC TRANSPARENT RESIN

(75) Inventors: Keun Hoon Yoo, Taejeon (KR); Jeong Su Choi, Yosu (KR); Sung Hee Kim, Yosu (KR); Chan Hong Lee, Taejeon (KR)

(73) Assignee: LG Chemical Co. Ltd., Seoul (KR)

( * ) Notice: Subject to any disclaimer, the term of this patent is extended or adjusted under 35 U.S.C. 154(b) by 21 days.

(21) Appl. No.: 10/070,772

(22) PCT Filed: Nov. 3, 2000

(86) PCT No.: PCT/KR00/01258

§ 371 (c)(1), (2), (4) Date: Mar. 6, 2002

(87) PCT Pub. No.: WO02/02691

PCT Pub. Date: Jan. 10, 2002

(30) Foreign Application Priority Data

Jul. 6, 2000 (KR) ........................................ 2000-38651

(51) Int. Cl.
*C08L 51/00* (2006.01)

(52) U.S. Cl. ............................ 523/201; 525/83; 525/84

(58) Field of Classification Search ................. 523/201; 525/83, 84

See application file for complete search history.

(56) References Cited

U.S. PATENT DOCUMENTS 5,795,936 A * 8/1998 Lin et al. ...................... 525/71

FOREIGN PATENT DOCUMENTS

| | | | |
|---|---|---|---|
| CN | 1149592 | | 5/1997 |
| DE | 4000543 | A1 | 7/1991 |
| DE | 4415336 | A1 | 11/1995 |
| EP | 514071 | A1 | 11/1992 |
| GB | 994924 | * | 6/1965 |
| JP | 284906 | | 11/1990 |
| JP | 319327 | | 12/1996 |
| JP | 178405 | | 6/2000 |
| WO | WO0026298 | | 5/2000 |

OTHER PUBLICATIONS

Minoru, Electronic Translation of JP2000–178405 (6–2000).*

* cited by examiner

*Primary Examiner*—Jeffrey Mullis
(74) *Attorney, Agent, or Firm*—Baker Botts LLP; Manu J. Tejwani

(57) ABSTRACT

The present invention relates to an impact resistant resin composition having superior balance of physical properties of chromacity, impact resistance and strength, and a process for preparing an impact resistant resin composition that can largely reduce draining treatment. The process of the present invention comprises the steps of preparing a resin without rubber ingredient by a mass polymerization, and adding and mixing a conjugated copolymer having rubber ingredient, when the resin is molten in the latter part of monomer-removal process, to prepare an impact resistant resin composition, wherein the conjugated copolymer is previously dehydrated and dried by filtering a copolymerization liquid.

9 Claims, No Drawings

PROCESS FOR PREPARING THERMOPLASTIC TRANSPARENT RESIN

CROSS REFERENCE TO RELATED APPLICATION

This application is based on application No. 10-2000-0038651 filed in the Korean Industrial Property Office on Jul. 6, 2000, the content of which is incorporated hereinto by reference.

BACKGROUND OF THE INVENTION (a) Field of the Invention

The present invention relates to a process for preparing thermoplastic transparent resin, more particularly to a process for preparing thermoplastic transparent resin having superior moisture, impact and heat resistance, natural color, and excellent transparency, which is prepared by blending transparent graft resin with methylmethacrylate-styrene-acrylonitrile (hereinafter referred to as "MSAN") copolymer after preparing the former through emulsion polymerization and the latter through bulk polymerization.

(b) Description of the Related Art

Recently, studies for providing materials used with high functionalities such as transparency, etc. have been strongly and actively pursued in order to promote differentiation of product models as industries advance, and technology continues to change our lives.

For example, studies for newly providing transparency to materials such as transparent windows of personnel communication systems, covers of washing machines through which machine contents can be seen, monitor housings through which internal components of computer monitors can be seen, game machine housings, transparent windows of home appliances and office appliances, etc. are intensively being pursued.

However, although acrylonitrile-butadiene-styrene (hereinafter referred to as "ABS") copolymer resin used in these conventional components is superior in terms of qualities such as impact resistance, chemical resistance, processibility, surface glossiness, etc., it is limited in application to materials in which transparency is required since it is an opaque material because of the nature of the resin.

The conventional technologies for providing plastic materials with transparency include 1) a method using transparent polycarbonate resin; 2) a method for providing transparent polymethyl methacrylate (PMMA) resin with impact resistance (U.S. Pat. No. 3,787,522); and 3) a method for providing high impact polystyrene (HIPS) resin with transparency (European Patent No. 703,252A2 and Japanese Patent Laid-open Publication No. Heisei 11-147920).

However, the method 1) has problems of low chemical resistance and impact resistance at a low temperature, and it is short in processibility hereby limiting application with large scale components, although ransparency and impact resistance at ordinary temperature are superior. The method 2) has an extremely lower impact resistance and a lower chemical resistance thus limiting applications, although transparency and processibility are superior. The method 3) has problems in that chemical resistance and scratch resistance are limited.

Therefore, suggested in U.S. Pat. No. 4,767,833 is a process for preparing transparent resin having superior impact resistance, chemical resistance, and processibility by graft copolymerizing styrene-butadiene rubber (SBR) latex with monomers such as methylmethacrylate, styrene, acrylonitrile, etc. in order to solve the problems. However, the method does not have good impact resistance at a low temperature, and it is limited in obtaining extremely superior transparent resin.

Furthermore, there are problems of deteriorated moisture and heat resistance in which products are discolored into a milky white color by hot water, and problems that products are discolored into a yellowish color by the influences of residual emulsifiers and coagulants remaining in the final products when the suggested technologies are applied to a product such as a transparent window of a washing machine, which has a great deal of contact with water.

SUMMARY OF THE INVENTION

It is an object of the present invention to prepare a thermoplastic resin having excellent impact resistance, chemical resistance, processibility, superior moisture and heat resistance, natural color, etc., and extremely superior transparency by blending transparent graft resin with MSAN copolymer after preparing transparent graft resin. This is done through emulsion polymerization in a manner whereby a refractive index of conjugated diene rubber latex is similar to that of a mixture of methylmethacrylate, styrene, acrylonitrile, etc., which are grafted to the conjugated diene rubber latex, and through preparing MSAN copolymer of which a refractive index is similar to that of transparent graft resin through bulk polymerization, in order to solve problems of the conventional technologies.

In order to accomplish the above object, the present invention provides a process for preparing thermoplastic transparent resin comprising the steps of:

(i) preparing transparent graft resin by grafting a monomer mixture comprising 20 to 50 parts by weight of conjugated diene rubber latex, 10 to 50 parts by weight of methacrylic acid alkylester compound or acrylic acid alkylester compound, 5 to 25 parts by weight of aromatic vinyl compound, and 1 to 10 parts by weight of vinyl cyanide compound, by emulsion polymerization;

(ii) preparing methylmethacrylate-styrene-acrylonitrile (MSAN) copolymer by copolymerizing 50 to 75 parts by weight of methacrylic acid alkylester compound or alkylester compound, 20 to 45 parts by weight of aromatic vinyl compound, and 1 to 10 parts by weight of vinyl cyanide compound during bulk polymerization; and (iii) blending the transparent graft resin of step i) with the MSAN copolymer of step ii).

DESCRIPTION OF THE INVENTION

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the description is to be regarded as illustrative in nature, and not restrictive.

The present invention is described in detail as follows.

The proper selection of particle diameter and gel content is important since particle diameter, gel content, etc., of conjugated diene rubber latex which is used in preparing transparent graft resin of the present invention greatly influence physical properties such as tansparency, impact strength, etc., of a product.

That is, the smaller the particle diameter of the rubber latex, the more superior the transparency is, and the greater the deterioration of the impact strength and fluidity. On the other hand, the larger the particle diameter, the more superior the impact strength is, but the greater the deterioration of the transparency. Furthermore, if gel content of the rubber latex is lower, transparency is deteriorated and impact strength is improved since many monomers are swelled on the rubber latex during the graft reaction, thereby increasing particle diameter. If the gel content is very high, transparency is superior since less monomers are swelled on the rubber latex, while impact resistance deteriorates since impact absorptivity is lowered. Therefore, proper selection of gel content is important Furthermore, the selection of emulsifiers is important. The selection of emulsifiers which are relatively stable even with pH variation is important since methylmethacrylate monomer causes severe pH variation due to its characteristics thus significantly dropping stability of latex, and its consumed amount should also be minimized to obtain a transparent resin having superior color, and moisture and heat resistance. Problems have occurred when transparent graft resin has been prepared with the rubber content being low to maintain stability of latex since stability of latex is greatly reduced depending on pH variations, particularly in the preparation process of transparent graft resin having a high rubber content. Furthermore, in order to prepare transparent resin having superior natural color, moisture and heat resistance, etc., by minimizing emulsifiers and coagulants remaining in the final product, the consumed amount of MSAN copolymer prepared through bulk polymerization should be large in a final product so that the consumed amount of transparent graft resin prepared by emulsion polymerization can be minimized.

A process for preparing a thermoplastic transparent resin having superior moisture and heat resistance, natural color, etc., in the present invention can be divided into 1) a preparation process of transparent graft resin, 2) a preparation process of MSAN copolymer, and 3) a preparation process of a transparent resin having superior moisture and heat resistance, natural color, etc., by blending transparent graft resin and MSAN copolymer.

1) Preparation Process of Graft Transparent Resin

The present invention provides a process for preparing a thermoplastic resin having superior moisture and heat resistance, natural color, impact resistance, etc., and extremely superior transparency after preparing a transparent graft resin having superior impact resistance through emulsion polymerization by mixing conjugated diene rubber latex having a particle diameter of 2000 to 5000 Å, gel content of 70 to 95%, and a swelling index of 12 to 30 with methacrylic acid alkylester compound, aromatic vinyl compound, vinyl cyanide compound, etc., so that a refractive index of the mixture can be similar to that of conjugated diene rubber latex, preparing a copolymer of methacrylic acid ester compound, aromatic vinyl compound, and vinyl cyanide compound which have similar refractive indexes to that of the transparent graft resin through bulk polymerization, and blending the transparent graft resin with the copolymer.

A refractive index of a monomer mixture used absolutely influences transparency, and the refractive index is controlled by the consumed amount and mix ratio of the monomer. That is, the consumed amount and mix ratio of the monomer are very important since the refractive index of polybutadiene is about 1.518, thus refractive indexes of all constituents grafted should be adjusted to a value similar to that in order to have superior transparency. Refractive indexes of each constituents used are 1.49 for methylmethacrylate, 1.59 for styrene, and 1.518 for acrylonitrile.

Furthermore, a thermoplastic transparent resin having superior transparency can be prepared when a refractive index of MSAN copolymer which is blended with the transparent graft resin is also adjusted to a value which is similar to that of the transparent graft resin. Methods for adding each monomer constituent to rubber latex when preparing transparent graft resin include a method in which each constituent is input in a batch process, and a method in which the total or partial amount of each monomer constituent is continuously input sequentially. A combined method is used in the present invention in which a batch type and a continuous type of inputting methods are used.

a) Preparation Process of Rubber Latex Having Small Diameter Particles

After putting 100 parts by weight of conjugated diene monomer, 1 to 4 parts by weight of emulsifier, 0.1 to 0.6 parts by weight of polymerization initiator, 0.1 to 1.0 parts by weight of electrolyte, 0.1 to 0.5 parts by weight of molecular weight controlling agent, and 90 to 130 parts by weight of ion exchange water into a reactor in a batch process, the reaction is carried out at a temperature 50 to 65° C. for 7 to 12 hours. And then, conjugated diene rubber latex having small diameter particles with a number average particle diameter of 600 to 1500 Å, gel content of 70 to 95%, and swelling index of about 12 to 30 is prepared by additionally adding a molecular weight controlling agent at 0.05 to 1.2 parts by weight to the reactant, and reacting the resulting mixture at a temperature of 55 to 70° C. for 5 to 15 hours.

Emulsifiers used in the present invention are one or more emulsifiers selected from the group consisting of alkylaryl sulfonate, alkali methylalkyl sulfate, sulfonated alkylester, soap of fatty acids, alkali salt of abietic acids, and a mixture thereof. A polymerization initiator is water soluble persulfate, peroxy compound, or redox system, and the most preferable water soluble persulfates are sodium and potassium persulfate. Fat soluble polymerization initiators are one or more initiators selected from the group consisting of cumene hydroperoxide, diisopropylbenzene hydroperoxide, azobisisobutyronitrile, tertiary butyl hydroperoxide, paramethane hydroperoxide, benzoyl peroxide, and a mixture thereof.

Electrolytes are one or more electrolytes selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $K_3PO_4$, $Na_3PO_4$, $K_2HPO_4$, $Na_2HPO_4$, and a mixture thereof. Mercaptan groups are mainly used as the molecular weight controlling agent.

The polymerization temperature is extremely important in adjusting gel content and swelling index of rubber latex, and selection of an initiator should also be considered at this time.

b) Preparation Process of Rubber Latex Having Large Diameter Particles (Fusion Process of Rubber Latex Having Small Diameter Particles)

Particles were enlarged by agitating the reactant while slowly adding 3.0 to 4.0 parts by weight of acetic acid aqueous solution to 100 parts by weight of rubber latex having small diameter particles of 600 to 1500 Å, gel than, content of 70 to 95%, and a swelling index of 12 to 30 for 1 hour. After then, rubber latex having large diameter particles of 2000 to 5000 Å, gel content of 70 to 95%, and a swelling index of 12 to 30 was prepared by stopping the agitation. Although a method for obtaining rubber latex which is used to provide for impact resistance can be prepared by a direct polymerization method as disclosed in Japanese Patent Laidopen Publication No. Showa 56-136807, the direct polymerization method takes a lot of reaction time and is limited in obtaining rubber latex having a high gel content. Therefore, preferable is a process in which rubber latex having large diameter particles is prepared by first preparing a high gel content rubber latex having small diameter particles in the above preparation process, and adding acidic materials to the rubber latex so that particles can be enlarged in order to prepare a high gel content rubber latex having large diameter particles within a short time.

c) Grafting Process 20 to 50 parts by weight of conjugated diene rubber latex prepared in the above process are graft copolymerized using 10 to 50 parts by weight of 20 methacrylic acid alkylester compound or acrylic acid alkylester compound, 5 to 25 parts by weight of aromatic vinyl compound, 1 to 10 parts by weight of vinyl cyanide compound, 0.2 to 0.6 parts by weight of emulsifier, 0.2 to 0.6 parts by weight of molecular weight controlling agent, 0.05 to 0.3 parts by weight of polymerization initiator, etc. Emulsifiers used in the polymerization reaction are one or more salts selected from the group consisting of alkylaryl sulfonate, alkali methylalkyl sulfate, sulfonated alkylester, and a mixture thereof Tertiary dodecyl mercaptan is mainly used as a molecular weight controlling agent. Redox catalyst which is a mixture of peroxide such as cumene hydroperoxide, diisopropylbenzene hydroperoxide, persulfates, etc., and a reductant such as sodium formaldehyde sulfoxylate, sodium ethylenediamine tetraacetate, primary iron sulfide, dextrose, sodium pyrroline, sodium sulfite, etc., can be used as a polymerization initiator. polymerization conversion ratio of latex obtained after terminating the polymerization is 98% or more, and powder is obtained by adding antioxidant and stabilizer to the latex thus coagulating into calcium chloride aqueous solution at a temperature of 80° C. or more, dehydrating, and drying the solution. Whether the above prepared graft copolymer is stable or not is determined by measuring a solid coagulating fraction (%) as in the following Formula 1:

Solid coagulating fraction (%)=(weight of coagulum produced in a reaction vat (g)/total weight of rubber and monomer)×100 [Formal]

When the solid coagulating fraction is 0.7% or more, latex stability is significantly dropped, and it is difficult to obtain graft copolymer which is appropriate to the present invention due to a large amount of coagulum. Mixing ratio of monomer in the present invention is very important in order to obtain a thermoplastic resin having superior transparency, and of which the refractive index is differentiated according to the mixing ratio. That is, since the refractive index of polybutadiene rubber latex is about 1.518, the total refractive index of a compound which is grafted to the polybutadiene rubber latex should also be similar to that value, and the refractive index of the total compound is preferably in the range of 1.513 to 1.521.

2) Preparation Process of MSAN Copolymers

The preparation process of MSAN copolymers is the bulk polymerization process, wherein the copolymers are prepared by controlling methylmethacrylate monomer, styrene monomer, and acrylonitrile monomer in a proper ratio during the preparation of copolymers through bulk polymerization so that refractive indexes of MSAN copolymers can be similar to the refractive index of transparent graft resin which is blended with these copolymers. 40 to 70 parts by weight of methylmethacrylate, 10 to 30 parts 15 by weight of styrene, and 1 to 10 parts by weight of acrylonitrile as monomers, 26 to 30 parts by weight of toluene as solvent, and ditertiary dodecyl mercaptan as a molecular weight controlling agent are used. The adding amount of the mixed raw material solution is maintained so that average reaction time is 2 hours, and a reaction temperature of 140 to 170° C. is maintained.

The preparation process is a continuous process utilizing a raw material injection pump, a continuous agitating vat, a preheating vat and a volatilizing vat, a polymer transferring pump, and an extruder.

The total refractive index of the copolymer compound should be similar to that of transparent graft resin, and a refractive index of the total compound is preferably in the range of 1.513 to 1.521.

3) Preparation Process of Ransparent Resin Having Superior Moisture and Heat Resistance, and Natural Color.

After adding MSAN copolymers prepared in the process 2), and filler, antioxidant, and photostabilizer to the transparent graft resin prepared in process 1) and blending them, transparent resin pellets having superior moisture and heat resistance, natural color, etc., are prepared using an extruding and blending machine at a temperature of 200 to 230° C. The prepared pellets are again extruded before measuring the physical properties.

The total refractive index of the blended thermoplastic transparent resin is preferably in the range of 1.513 to 1.521.

Furthermore, moisture and heat resistance is examined by the deviation between Haze before and after the prepared resin is left at a temperature of 70° C. at 90% humidity for 72 hours. The more Haze deviation Δ Haze), the lower the moisture and heat resistance. Color (value b) is more preferable when it is close to 0 since the closer b is to a value of 0, the closer to natural color the product is, and the higher the value b is, the more yellowish the product is.

The present invention is described more in detail in the following EXAMPLES, wherein the EXAMPLES are only for exemplifying the present invention, however the present invention is not limited to the EXAMPLES only.

EXAMPLES

Evaluation of major physical properties was performed in EXAMPLES using the following measuring methods:

a) Izod impact strength was measured according to American Society for Testing and Materials (ASTM) standard D 256;

b) Haze (transparency) was measured according to ASTM standard D 1003;

c) b value (color difference: Lab system) was measured according to JIS K-7105; and d) Refractive index was measured according to ASTM standard D 542.

Example 1

1) Preparation Process of Transparent Graft Resin a) Preparation Process of Rubber Latex Having Small Diameter Particles After putting 110 parts by weight of ion exchange water, 100 parts by weight of 1,3-butadiene as a monomer, 1.2 parts by weight of the emulsifier potassium abietate and 1.5 parts by weight of potassium oleate as an emulsifier, 0.1 part by weight of sodium carbonate ($Na_2CO_3$) and 0.5 parts by weight of potassium hydrogencarbonate ($KHCO_3$) as an electrolyte, and 0.3 parts by weight of tertiary dodecyl mercaptan (TDDM) as a molecular weight controlling agent into a nitrogen substituted polymerization reactor (autoclave) in a batch process and increasing the reaction temperature to 55° C., the reaction was initiated by adding 0.3 part by weight of potassium persulfate as an initiator to the reactant. After reacting for 10 hours, 0.05 parts by weight of tertiary dodecyl mercaptan was again added to the reactant and reacted at a temperature of 65° C. for 8 hours, thereby terminating the reaction. And then, the obtained rubber latex was analyzed in the following analyzing method.

i ) Gel Content and Swelling Index

After coagulating the rubber latex using dilute acid or metallic salt, washing, and drying in a dry oven at 60° C. for 24 hours, a lump of rubber was obtained. After cutting the obtained lump of rubber into small pieces, 1 g of rubber fragment was put into 100 g of toluene and stored in a darkroom at room temperature for 48 hours. And then, the rubber fragment was divided into sol and gel, and gel content and swelling index were measured according to the following Formulae 2 and 3:

Gel content (%)=(weight of insoluble gel fragment/weight of sample)×100 [Formula 2]

Swelling index=eight of swelled gel/weight of gel [Formula 3]

ii) Particle Diameter

Particle diameter was measured with a dynamic laser light scattering method using 370 HPL of the Nicomp Corporation of the U.S.A. A particle diameter of the obtained rubber latex was about 1000 Å, gel content was 90%, and swelling index was about 18.

b) Preparation Process of Rubber Latex Having Large Diameter Particles (Fusion Process of Rubber Latex Having Small Diameter Particles)

After putting 100 parts by weight of rubber latex having small diameter particles prepared in the EXAMPLE into a reaction vat, and adjusting reaction speed to 10 rpm and reaction temperature to 30° C., 3.5 parts by weight of 7% acetic acid aqueous solution were slowly put into the reactant over 1 hour. Rubber latex having large diameter particles was prepared by leaving the mixture alone for 30 minutes after stopping the agitation. The rubber latex having large diameter particles prepared in the fusion process was analyzed. A particle diameter of the obtained rubber latex was about 3000 Å, gel content of which was 90%, and swelling index of which was about 17.

c) Grafting Process

After putting 40 parts by weight of rubber latex prepared by the above preparation process, 0.1 part by weight of emulsifier alkylaryl sulfonate, 13.68 parts by weight of methylmethacrylate, 5.32 parts by weight of styrene, 1 part by weight of acrylonitrile, 0.2 parts by weight of tertiary dodecyl mercaptan, 0.048 parts by weight of sodium pyrophosphate, 0.012 parts by weight of dextrose, 0.001 part by weight of primary iron sulfide, and 0.04 parts by weight of cumene hydroperoxide into a nitrogen substituted polymerization reactor at a temperature of 50° C. in a batch process, the reactant was reacted while increasing the reaction temperature to 73° C. over 1 hour. After continuously putting a mixed emulsifying solution comprising 70 parts by weight of ion exchange water, 0.2 parts by weight of alkylaryl sulfonate, 27.36 parts by weight of methylmethacrylate, 10.64 parts by weight of styrene, 2 parts by weight of acrylonitrile, 0.25 parts by weight of tertiary dodecyl mercaptan, 0.048 parts by weight of sodium pyrophosphate, 0.012 parts by weight of dextrose, 0.001 part by weight of primary iron sulfide, and 0.10 part by weight of cumene hydroperoxide into the reactant for 3 hours and again increasing the reaction temperature to 76° C., the resultant reactant was aged for 1 hour before terminating the reaction. The polymerization conversion ratio was 99.5%, and the solid coagulated fraction was 0.1%. Thereafter, the latex was coagulated with calcium chloride aqueous solution and washed, thereby obtaining powder.

2) Preparation Process of MSAN Copolymer

A reaction temperature of 157° C. was maintained while continuously putting a raw material in which 68.4 parts by weight of methylmethacrylate, 26.6 parts by weight of styrene, 5 parts by weight of acrylonitrile, 30 parts by weight of solvent toluene, and 0.15 parts by weight of molecular weight controlling agent ditertiary dodecyl mercaptan were mixed into a reaction vat so that average reaction time could be 2 hours. After heating the polymerized solution discharged from a reaction vat at a preheating vat and volatilizing unreacted monomer from a volatilizing vat, a polymer temperature of 210° C. was maintained so that copolymer resin was processed into a pellet form using a transferring pump and an extruder.

3) Preparation Process of Transparent Resin Having Superior Moisture and Heat Resistance and Natural Color.

After preparing pellets using a biaxial extruder at a temperature of 210° C. by putting 0.2 parts by weight of filler, 0.1 part by weight of antioxidant, and 0.1 part by weight of photostabilizer into 45 parts by weight of transparent graft resin prepared by the process 1) and 55 parts by weight of MSAN copolymer prepared by the process 2) and blending them, the pellets were again extruded to prepare transparent resin of which physical properties were measured. Color, moisture and heat resistance, and initial transparency of the resin samples were superior, wherein impact strength was 16, color (value b) was 0.0, initial Haze was 2.3, and Haze deviation after the moisture and heat resistance test was about 5.

Comparative Example 1

A transparent resin was prepared in the same method as in the EXAMPLE 1 except that 16 parts by weight of methylmethacrylate, 3 parts by weight of styrene and 1 part by weight of acrylonitrile instead of 13.68 parts by weight of methylmethacrylate, 5.32 parts by weight of styrene, and 1 part by weight of acrylonitrile used in the initial stage of c) grafting process of 1) were used, and 31 parts by weight of methylmethacrylate, 7 parts by weight of styrene, and 2 parts by weight of acrylonitrile instead of 27.36 parts by weight of methylmethacrylate, 10.64 parts by weight of styrene, and 2 parts by weight of acrylonitrile used in the later stage of c) grafting process of 1) were used, and its physical properties were measured. Color, and moisture and heat resistance were superior but initial Haze (transparency) was not good in the transparent resin samples, wherein impact strength was 16.5, color (value b) was 0.15, initial Haze was 9.8, and Haze deviation after the moisture and heat resistance test was about 5. The initial transparency deteriorated due to the refractive index difference between transparent graft resin and MSAN.

Comparative Example 2

A transparent resin was prepared in the same method as in the EXAMPLE 1 except that 12 parts by weight of methylmethacrylate, 7 parts by weight of styrene and 1 part by weight of acrylonitrile instead of 13.68 parts by weight of methylmethacrylate, 5.32 parts by weight of styrene, and 1 part by weight of acrylonitrile used in the initial stage of c) grafting process of 1) were used, and 25 pans by weight of methylmethacrylate, 13 parts by weight of styrene, and 2 parts by weight of acrylonitrile instead of 27.36 parts by weight of methylmethacrylate, 10.64 parts by weight of styrene, and 2 parts by weight of acrylonitrile used in the later stage of c) grafting process of 1) were used, and its physical properties were measured. Color, and moisture and heat resistance were superior while initial Haze (transparency) was not good in the transparent resin samples, wherein impact strength was 15.5, color (value b) was 0.1, initial Haze was 9.3, and Haze deviation after the moisture and heat resistance test was about 4. The initial transparency (Haze) deteriorated due to the refractive index difference between transparent graft resin and MSAN.

Comparative Example 3

A transparent resin was prepared in the same method as in the EXAMPLE 1 except that 76 parts by weight of methylmethacrylate, 19 parts by weight of styrene and 5 parts by weight of acrylonitrile instead of 68.4 parts by weight of methylmethacrylate, 26.6 parts by weight of styrene, and 5 parts by weight of acrylonitrile used in the 2) preparation process of MSAN copolymer were used, and its physical properties were measured. Color, and moisture and heat resistance were superior while initial Haze (transparency) was not good in the transparent resin samples, wherein impact strength was 16, color (value b) was 0.15, initial Haze was 9.4, and Haze deviation after the moisture and heat resistance test was about 5. The initial transparency (Haze) deteriorated due to the refractive index difference between transparent graft resin and MSAN.

Comparative Example 4

A transparent resin was prepared in the same method as in the EXAMPLE 1 except that 64 parts by weight of methylmethacrylate, 31 parts by weight of styrene and 5 parts by weight of acrylonitrile instead of 68.4 parts by weight of methylmethacrylate, 26.6 parts by weight of styrene, and 5 parts by weight of acrylonitrile used in the 2) preparation process of MSAN copolymer were used, and its physical properties were measured. Color, and moisture and heat resistance were superior while initial Haze (transparency) was not good in the transparent resin samples, wherein impact strength was 15.5, color (value b) was 0.1, initial Haze was 9.9, and Haze deviation after the moisture and heat resistance test was about 5. The initial transparency (Haze) deteriorated due to the refractive index difference between transparent graft resin and MSAN.

Comparative Example 5

A transparent resin was prepared in the same method as in the EXAMPLE 1 except that 0.1 part by weight of potassium oleate instead of 0.1 part by weight of emulsifier alkylaryl sulfonate used in the initial stage of c) grafting process of 1) were used. As a result of polymerization, lots of solid coagulum was produced due to the deterioration of latex stability, thereby the result of this method does not fit to the object of the present invention.

Comparative Example 6

A transparent resin was prepared in the same method as in the EXAMPLE 1 except that 0.3 parts by weight of potassium oleate instead of 0.1 part by weight of emulsifier alkylaryl sulfonate used in the initial stage of c) grafting process of 1) were used, and its physical properties were measured. Color was not good, and moisture and heat resistance were also sub-standard in the transparent resin samples, wherein impact strength was 16, color (value b) was 2.8, initial Haze was 4.5, and Haze deviation after the moisture and heat resistance test was about 17.

Comparative Example 7

A transparent resin was prepared in the same method as in the EXAMPLE 1 except the following.

After putting 18 parts by weight of rubber latex, 90 parts by weight of ion exchange water, 0.1 part by weight of emulsifier alkylaryl sulfonate, 13.68 parts by weight of methylmethacrylate, 5.32 parts by weight of styrene, 1 part by weight of acrylonitrile, 0.2 parts by weight of tertiary dodecyl mercaptan, 0.048 parts by weight of sodium pyrophosphate, 0.012 parts by weight of dextrose, 0.001 part by weight of primary iron sulfide, and 0.04 parts by weight of cumene hydroperoxide into a reactor at a temperature of 50° C. in a batch process, the reaction was performed while increasing the reaction temperature to 73° C. over 1 hour. After continuously adding a mixed emulsifying solution comprising 70 parts by weight of ion exchange water, 0.2 parts by weight of alkylaryl sulfonate, 43.2 parts by weight of methylmethacrylate, 16.8 parts by weight of styrene, 2 parts by weight of acrylonitrile, 0.25 parts by weight of tertiary dodecyl mercaptan, 0.048 parts by weight of sodium pyrophosphate, 0.012 parts by weight of dextrose, 0.001 part by weight of primary iron sulfide, and 0.10 part by weight of cumene hydroperoxide into the reactant over 3 hours and again increasing the reaction temperature to 76° C., the resulting reactant was aged for 1 hour, thereby terminating the reaction. The polymerization conversion ratio was 99.8%, and the solid coagulated fraction was 0.05%. Thereafter, the latex was coagulated with calcium chloride aqueous solution and washed, thereby obtaining powder.

Furthermore, after preparing pellets using a biaxial extruder at a temperature of 210° C. by putting 0.2 parts by weight of filler, 0.1 part by weight of antioxidant, and 0.1 part by weight of photostabilizer into 100 parts by weight of powder obtained in the 1) preparation process of transparent graft resin without a preparation process of MSAN copolymer and blending them, the pellets were again extruded to prepare transparent resin of which physical properties were measured. Color was not good, and moisture and heat resistance, etc., were also deteriorated in the transparent resin samples, wherein impact strength was 16.5, color (value b) was 3.2, initial Haze was 4.9, Haze deviation after the moisture and heat resistance test was about 12.

A preparation process of thermoplastic transparent resin according to the present invention can prepare a thermoplastic transparent resin having excellent impact resistance, chemical resistance, processibility, etc., superior moisture and heat resistance, natural color, etc., and extremely superior transparency after preparing a transparent graft resin having superior impact resistance, transparency, etc., through emulsion polymerization by employing methylmethacrylate and controlling contents and mixing ratios of each constituent employed so that the refractive index of conjugated diene rubber latex can be similar to that of a mixture of methylmethacrylate, styrene, acrylonitrile, etc., which are grafted to the conjugated diene rubber latex in preparing acrylonitrile-butadiene-styrene (ASS) resin comprising acrylonitrile providing superior chemical resistance, butadiene providing superior impact resistance, and styrene providing superior processibility, preparing an MSAN copolymer of which the refractive index is similar to that of transparent graft resin in the emulsion polymerization process, and blending the transparent graft resin with the MSAN copolymer.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A process for preparing thermoplastic transparent resin comprising the steps of:

(i) preparing a transparent graft resin by grafting a monomer mixture comprising 20 to 50 parts by weight of conjugated diene rubber latex, 10 to 50 parts by weight of methacrylic acid alkylester compound or acrylic acid alkylester compound, 5 to 25 parts by weight of aromatic vinyl compound, and 1 to 10 parts by weight of vinyl cyanide compound through an emulsion polymerization using between 0.2 and 0.3 parts by weight of alkylaryl sulfonate salts as emulsifier;

(ii) preparing methylmethacrylate-styrene-acrylonitrile (MSAN) copolymer by copolymerizing 50 to 75 parts by weight of methacrylic acid alkylester compound or alkylester compound, 20 to 45 parts by weight of aromatic vinyl compound, and 1 to 10 parts by weight of vinyl cyanide compound during bulk polymerization; and (iii) blending the transparent graft resin of step (i) with the MSAN copolymer of step (ii).

2. The process for preparing thermoplastic transparent resin according to claim 1, wherein a difference of refractive index between the conjugated diene rubber latex and monomer mixture grafted is within the range of 0 to 0.004.

3. The process for preparing thermoplastic transparent resin according to claim 1, wherein a difference of refractive index between the conjugated diene rubber latex and MSAN copolymer is within the range of 0 to 0.004.

4. The process for preparing thermoplastic transparent resin according to claim 1, wherein the conjugated diene rubber latex is an aliphatic conjugated diene compound, or a mixture of an aliphatic conjugated diene compound and an ethylene based unsaturated monomer.

5. The process for preparing thermoplastic transparent resin according to claim 1, wherein the conjugated diene rubber latex has a gel content of 70 to 95% and a swelling index of 12 to 30.

6. The process for preparing thermoplastic transparent resin according to claim 1, wherein the methacrylic acid alkylester compound or acrylic acid alkylester compound is methylmethacrylate.

7. The process for preparing thermoplastic transparent resin according to claim 1, wherein the aromatic vinyl compound is a compound selected from the group consisting of styrene, α-methylstyrene, o-ethylstyrene, ρ-ethylstyrene, and vinyltoluene.

8. The process for preparing thermoplastic transparent resin according to claim 1, wherein the vinyl cyanide compound is a compound selected from the group consisting of acrylonitrile, methacrylonitrile, and ethacrylonitrile.

9. The process for preparing thermoplastic transparent resin according to claim 1, wherein the emulsion polymerization step (i) and bulk polymerization step (ii) are carried out using one or more polymerization initiators selected from the group consisting of cumene hydroperoxide, diisopropylbenzene hydroperoxide, and persulfate.

* * * * *